No. 756,274. PATENTED APR. 5, 1904.
O. O. OZIAS.
SPRING BALANCE SCALE.
APPLICATION FILED JUNE 27, 1902. RENEWED FEB. 18, 1904.
NO MODEL. 2 SHEETS—SHEET 1.

No. 756,274. PATENTED APR. 5, 1904.
O. O. OZIAS.
SPRING BALANCE SCALE.
APPLICATION FILED JUNE 27, 1902. RENEWED FEB. 18, 1904.
NO MODEL. 2 SHEETS—SHEET 2.
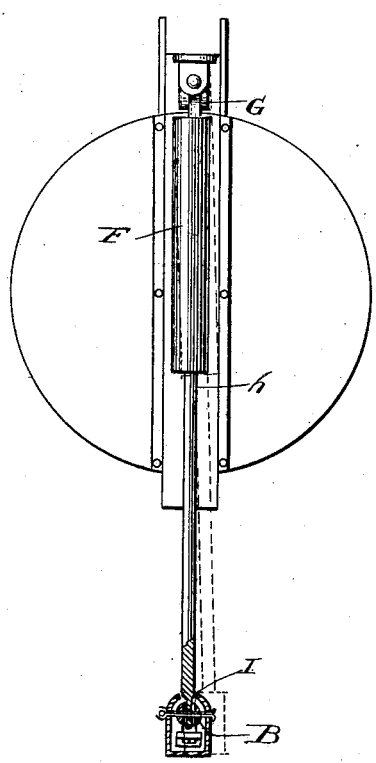
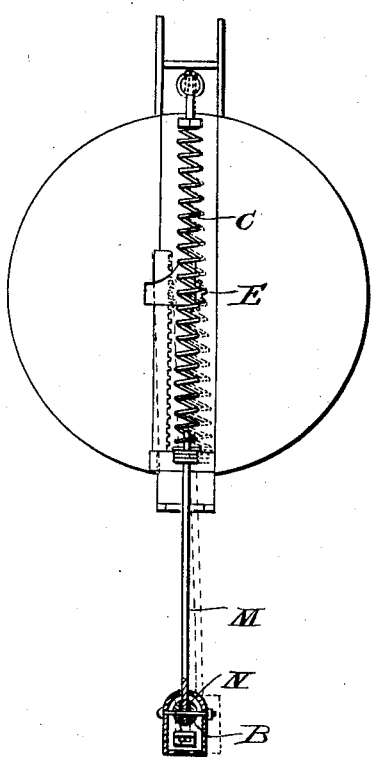

No. 756,274. Patented April 5, 1904.

UNITED STATES PATENT OFFICE.

ORANGE O. OZIAS, OF DAYTON, OHIO.

SPRING-BALANCE SCALE.

SPECIFICATION forming part of Letters Patent No. 756,274, dated April 5, 1904.

Application filed June 27, 1902. Renewed February 18, 1904. Serial No. 194,298. (No model.)

*To all whom it may concern:*

Be it known that I, ORANGE O. OZIAS, of Dayton, in the county of Montgomery, State of Ohio, have invented certain new and useful Improvements in Spring-Balance Scales; and I do hereby declare the following to be a full, clear, and exact description of the same, reference being had to the accompanying drawings, forming a part of this specification, and to the letters of reference marked thereon.

This invention relates to improvements in spring-balance scales or scales wherein the goods to be weighed are counterbalanced by suitable springs and the extension of said springs under the influence of the weight of the goods determines the weight, the weight indications being read from a suitable indicator controlled by the springs. In such scales it is very essential that the goods-support and springs shall be suspended freely, so as to be capable of a slight transverse swing in any direction, and that no extraneous influence shall operate upon the springs, support, or goods which will in any degree change the final balancing-point. At the same time it is highly desirable and in many types of scale absolutely essential that sudden or violent movements in the direction of the extension and contraction of the springs should be counteracted and modified, so as to avoid injury to the scale parts and to reduce vibration and bring the indicating mechanism and other moving parts to rest quickly.

The objects of the present invention are to accomplish these desirable ends by simple and cheap mechanical means, to which end the invention consists in providing a pneumatic dash-pot-controlling mechanism supported to swing transversely in any direction, and, further, in a mechanism of this character in which the angular movement or swing shall substantially coincide with the angular movement or swing of the counterbalancing-springs.

The invention further consists in certain novel details of construction and combinations of parts, all as will be hereinafter described, and pointed out particularly in the appended claims.

Figure 1:
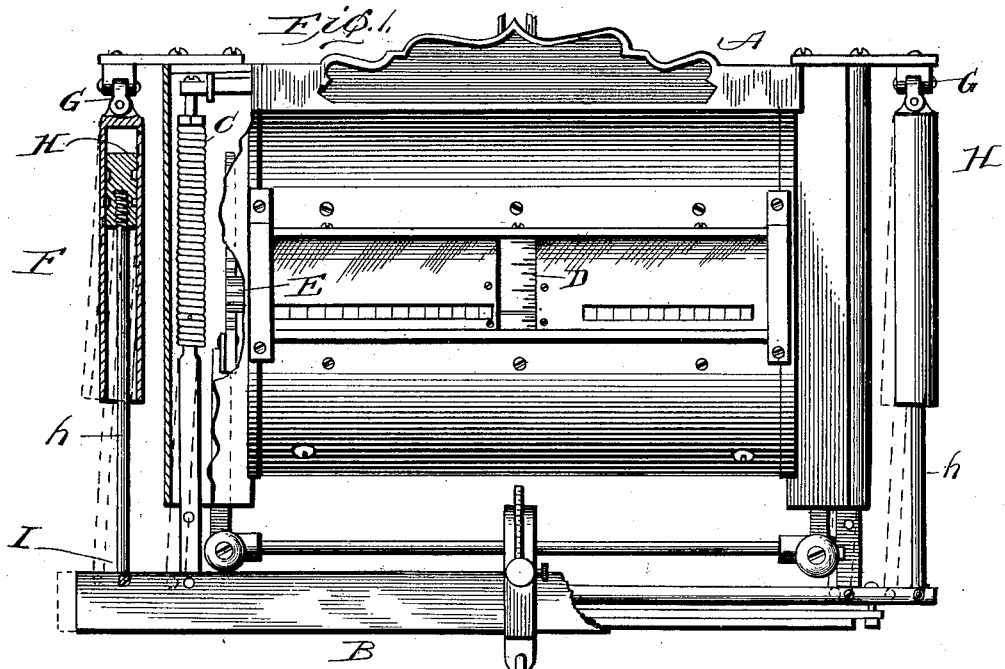
Figure 2:
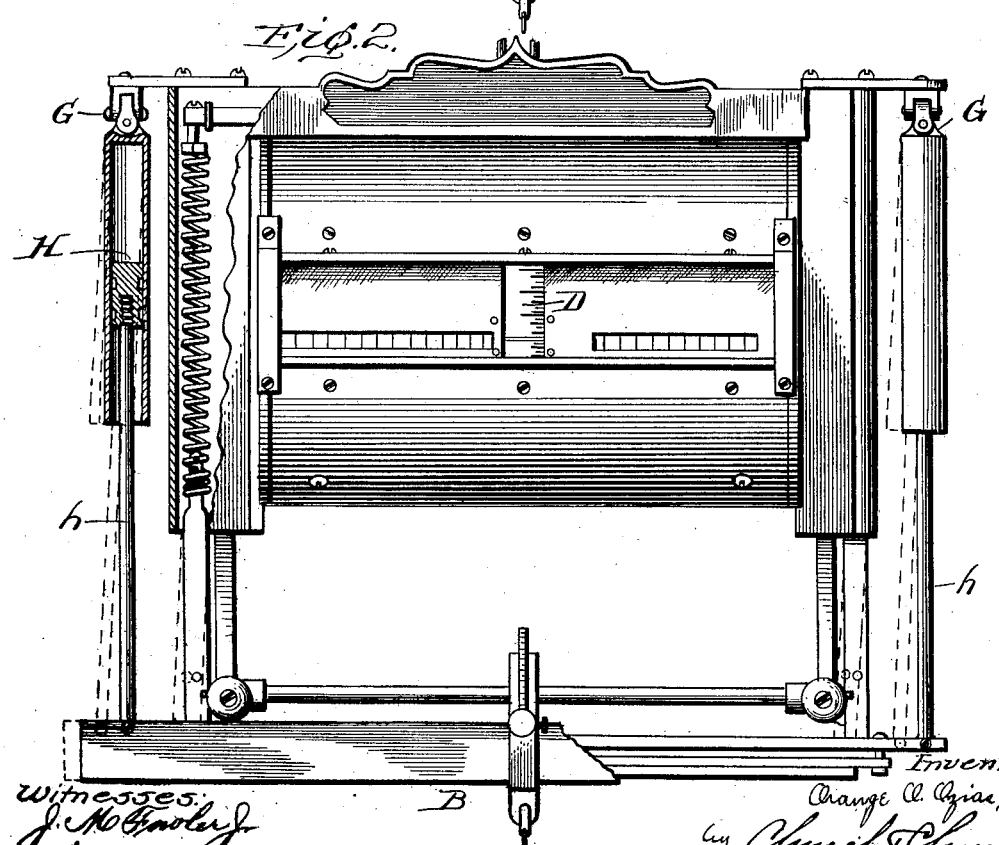

Referring to the accompanying drawings, Figure 1 is an elevation of a spring-balance scale embodying the present invention, with parts broken away and in section to illustrate the internal construction. Fig. 2 is a view corresponding to Fig. 1 with the springs extended as by a heavy load. Fig. 3 is an end elevation with the joint between the piston-rod and runner in section. Fig. 4 is a vertical section taken outside of one of the end springs and looking toward the body of the scale.

In the drawings the transverse swing is indicated by dotted lines, and the type of scale shown, it will be understood, is simply illustrative, as the invention is applicable to any type of scale where a runner or load-support having a swing transverse to the line of spring extension is employed.

The letter A in said drawings indicates the casing or frame; B, the runner or goods-support; C, the springs carrying the goods-support and themselves hung near the top of the casing, so as to be capable of a slight swing in unison with the runner. The runner is geared or connected with the indicator D by rack-and-pinion connections E or other usual connecting mechanism, whereby the indicator will be moved in unison with the runner, or the runner itself may constitute an indicator, as in some types of scales.

Arranged parallel with the springs and connected with the frame or casing and runner at points corresponding to the points of suspension and connection of the springs are the pneumatic dash-pot-controlling devices. Two of these devices are shown, although any desired number may be employed, due consideration being had in the arrangement to balancing up the strains, so as to avoid lateral deflection. The cylinders F of the controllers are hung at their closed ends by connections permitting of a swinging movement in any direction—such, for instance, as the universal joint G, which is one of the well-known types of universal joints with pivots arranged at right angles to each other, although any other well-known and equivalent joint to permit of a slight universal movement may be substituted. The piston H, working in the cylinder, is rigidly mounted on the upper end of its rod $h$, and the lower end of the rod is loosely connected with the runner or goods-support at I, the joint at I permitting of a swinging movement of the parts, as in the case of the joint between the cylinder and its support. The desired result may be secured by a pivotal connection having sufficient looseness for the purpose, as shown in Fig. 3 of the drawings. The connection between the rod M, which forms an extension of the spring and the runner, is also preferably somewhat loose, as shown at N in Fig. 4, in order that there may be no binding at this point.

It will be observed that the distance between the pivotal connections of the cylinder and plunger-rod and the distance between the end connections of the springs is approximately the same and varies in substantially the same ratio. Thus the angular position of the dash-pot governor corresponds to the angular position of the springs, regardless of the load or the swing of the runner, and at no moment is any transverse or binding strain set up in the dash-pot mechanism, because the axes of the cylinder and plunger-rod are always in alinement, and the strain of the springs and load always act in a line corresponding to said axes.

Having thus described my invention, what I claim as new, and desire to secure by Letters Patent, is—

1. In a spring-balance scale, the combination of a vertically-movable runner for supporting the load and springs supporting said runner, said springs and runner being suspended to swing freely to a limited extent in any direction, of a governor controlling the vertical movements of the runner, embodying a pneumatic dash-pot cylinder, a plunger therein and a connecting-rod, said cylinder and connecting-rod being jointed one to a fixed support and the other to the runner to swing in any direction in unison with the runner to maintain an angular position approximately corresponding to the angular position of the springs; substantially as described.

2. In a spring-balance scale, the combination with the suspended counterbalancing-springs and runner suspended from said springs to have a limited swing in any direction, of a pneumatic dash-pot cylinder suspended to swing in any direction, a plunger in said cylinder, a plunger-rod rigidly connected with said plunger and jointed to the runner by a joint permitting it to swing in any direction whereby the axes of the cylinder and rod will be maintained in alinement; substantially as described.

3. In a spring-balance scale, the combination with the runner and its counterbalancing-springs suspended at their upper ends, from a fixed support, of the pneumatic dash-pot cylinder, plunger working therein and plunger-rod rigidly connected with the plunger, said rod and cylinder being arranged parallel with the springs and jointed the one to the fixed support and the other to the runner at points corresponding to the points of attachment of the springs, whereby the parallelism of the springs and dash-pot controller will be maintained regardless of the extension and lateral swing of the springs; substantially as described.

4. In a spring-balance scale, the combination of a vertically-movable runner for supporting the load and springs supporting said runner, of a governor controlling the vertical movements of the runner, embodying a pneumatic dash-pot cylinder, a plunger therein and a connecting-rod, said cylinder and connecting-rod being jointed one to a fixed support and the other to the runner to swing in any direction so as to maintain an angular position approximately corresponding to the angular position of the springs.

ORANGE O. OZIAS.

Witnesses:
 GEO. W. KEPLER,
 EARL K. BULL.